(12) United States Patent
Kim et al.

(10) Patent No.: US 8,896,567 B2
(45) Date of Patent: Nov. 25, 2014

(54) PIXEL CIRCUIT AND DISPLAY APPARATUS INCLUDING THE SAME

(75) Inventors: Jung-Woo Kim, Hwaseong-si (KR); Yong-Wan Jin, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 839 days.

(21) Appl. No.: 13/096,447

(22) Filed: Apr. 28, 2011

(65) Prior Publication Data

US 2011/0310079 A1 Dec. 22, 2011

(30) Foreign Application Priority Data

Jun. 18, 2010 (KR) .................... 10-2010-0058226

(51) Int. Cl.
  *G06F 3/045* (2006.01)
  *G09G 3/34* (2006.01)
  *G06F 3/041* (2006.01)

(52) U.S. Cl.
  CPC ...... *G06F 3/0412* (2013.01); *G09G 2300/0456* (2013.01); *G09G 2300/088* (2013.01); *G09G 2380/14* (2013.01); *G09G 3/3433* (2013.01)
  USPC ............................ 345/174; 345/104; 345/173

(58) Field of Classification Search
  CPC ....... G06F 3/0412; G06F 3/042; G06F 3/044; G06F 2203/04106; G06F 3/041; G02F 1/13318; G09G 3/3648; G09G 2360/148; G09G 2360/14
  USPC .......................................... 345/173–175, 104
  See application file for complete search history.

(56) References Cited

U.S. PATENT DOCUMENTS

| 5,446,564 A | * | 8/1995 | Mawatari et al. | 349/116 |
| 6,323,846 B1 | * | 11/2001 | Westerman et al. | 345/173 |
| 2007/0176905 A1 | | 8/2007 | Shih et al. | |
| 2008/0007534 A1 | | 1/2008 | Peng et al. | |
| 2008/0198140 A1 | * | 8/2008 | Kinoshita et al. | 345/173 |
| 2009/0115735 A1 | | 5/2009 | Chuang | |
| 2011/0205178 A1 | * | 8/2011 | Yoshida et al. | 345/173 |
| 2012/0044188 A1 | * | 2/2012 | Prendergast et al. | 345/174 |

FOREIGN PATENT DOCUMENTS

| JP | 2008058925 A | 3/2008 |
| KR | 20040069343 A | 3/2006 |
| KR | 100918657 A | 2/2009 |
| KR | 20090123141 A | 12/2009 |

* cited by examiner

*Primary Examiner* — Koosha Sharifi-Tafreshi
(74) *Attorney, Agent, or Firm* — Harness, Dickey & Pierce, P.L.C.

(57) ABSTRACT

A pixel circuit includes a first transistor that supplies a data signal to a first node in response to a scan signal. The pixel circuit may also include a capacitor that is connected between the first node and a ground voltage and a detecting unit that is connected in parallel with the capacitor. More so, the detecting unit may change a voltage of the first node by being activated in response to a mode signal. Also, the detecting unit may have resistance that varies according to an external stimulus. The pixel circuit may also include a second transistor that is complementarily activated with respect to the detecting unit in response to the mode signal, and that provides a voltage of the first node.

20 Claims, 8 Drawing Sheets

PIXEL CIRCUIT AND DISPLAY APPARATUS INCLUDING THE SAME

CROSS-REFERENCE TO RELATED APPLICATIONS

This application claims the benefit of Korean Patent Application No. 10-2010-0058226, filed on Jun. 18, 2010, in the Korean Intellectual Property Office, the disclosure of which is incorporated herein in its entirety by reference.

BACKGROUND

1. Field

The present disclosure relates to a pixel circuit, and more particularly, to a pixel circuit capable of detecting and displaying an external stimulus, and a display apparatus including the pixel circuit.

2. Description of the Related Art

An active matrix liquid crystal display (AMLCD) capable of detecting an external stimulus desires or demands use of elements externally added to internal elements or a screen of the AMLCD. In general, a method of operating an AMLCD is a resistive touch method.

However, when the AMLCD capable of detecting the external stimulus is embodied, additional elements for detecting an external stimulus are arranged such that a display apparatus having the AMLCD may not be small-sized.

SUMMARY

Provided is a small-sized pixel circuit including a capacitor capable of performing detecting and displaying operations.

Provided are a pixel circuit including pixels configured to perform a detecting operation. The pixel circuit may also include a display apparatus being configured to perform a high definition detecting operation.

Additional aspects will be set forth in part in the description that follows and, in part, will be apparent from the description, or may be learned by practice of the presented example embodiments.

According to an aspect of example embodiments, a pixel circuit includes a first transistor configured to supply a data signal to a first node in response to a scan signal. The pixel circuit may also include a capacitor that is connected between the first node and a ground voltage and a detecting unit that is connected in parallel with the capacitor. The detecting unit may change a voltage of the first node by being activated in response to a mode signal. The detecting unit may have a resistance that varies according to an external stimulus. The pixel circuit may also include a second transistor that is complementarily activated with respect to the detecting unit in response to the mode signal, and that is configured to provide a voltage of the first node.

The detecting unit may include a third transistor that comprises a first terminal connected to the first node, and a gate receiving a detection control signal. The detecting unit may include a switch that electrically connects a second terminal of the third transistor and the ground voltage in response to the mode signal. For example, the third transistor may be a photo resistor whose resistance varies according to an amount of light of the external stimulus. Also, the detection control signal may have a voltage that is smaller than a threshold voltage value of the third transistor.

The detecting unit may be a piezo resistor whose resistance varies according to a pressure of the external stimulus.

The pixel circuit may further include a determining unit that is activated in response to the scan signal and is configured to output a detection signal according to the voltage of the first node.

The determining unit may include an amplifier and a feedback capacitor. The amplifier may include a first terminal for receiving the voltage of the first node and a second terminal configured to receive a reference voltage. The determining unit may amplify a voltage difference between the first terminal and the second terminal, and may be configured to provide the detection signal to an output terminal. The feedback capacitor may be connected between the first terminal and the output terminal, and may limit, reduce or prevent the voltage of the first node from sharply changing.

The pixel circuit may further include a display device that is connected to the second transistor. The display device may include a liquid crystal display (LCD) device, a plasma display device, an organic electroluminescent device, or an electrophoretic device.

If the mode signal corresponds to a first logic state, the data signal may correspond to an image signal, the second transistor may be activated and be configured to provide the image signal to the display device in response to a selection signal, and the detecting unit may be deactivated.

If the mode signal corresponds to a second logic state, the data signal may have a required, desired or preset value, the detecting unit may be activated and configured to discharge charges stored in the capacitor, and the second transistor may be deactivated.

The second transistor may include a first terminal connected to the first node, a gate receiving the mode signal, and a second node connected to the display device. Also, the second transistor may include a second node connected to the display device, a gate connected to the first node, and a second terminal receiving the mode signal.

According to another example embodiment, a display apparatus includes a control unit, a scan driver, a data driver, and a pixel array. The control unit may be configured to generate a data control signal, a scan control signal, and a mode signal. The scan driver may be configured to generate a scan signal according to the scan control signal. The data driver may be configured to generate a data signal according to the data control signal. The pixel array may transfer the data signal in response to the scan signal if the mode signal corresponds to a first logic state, and may provide the data driver with a data signal changed according to an external stimulus in response to the scan signal if the mode signal corresponds to a second logic state, according to the data signal, the scan signal, and the mode signal.

The pixel array may include a plurality of scan lines, a plurality of data lines, and a plurality of pixel circuits that are connected to the plurality of scan lines and the plurality of data lines, respectively. Each of the plurality of pixel circuits may include a first transistor that is configured to supply the data signal to a first node in response to the scan signal; a capacitor that is connected between the first node and a ground voltage. Each of the plurality of pixel circuits may also include a detecting unit that is connected between the first node and the ground voltage, and the detecting unit configured to change the data signal by being activated in response to the mode signal. Also, the detecting unit may have a resistance that varies according to an external stimulus. Each of the plurality of pixel circuits may also include a second transistor that is complementarily activated with respect to the detecting unit in response to the mode signal, and configured to provide a voltage of the first node. Furthermore, each of the plurality of pixel circuits may include a display device that is configured to receive the voltage of the first node from the second transistor.

The detecting unit may include a photo thin film transistor (TFT) and a piezo resistor that have resistances varying according to an external stimulus.

The display device may include a first terminal configured to receive the voltage of the first node and a second terminal configured to receive an external voltage. The display device may be a reflective display device that is configured to display different images according to an electric field.

The data driver may include a determining unit that is configured to generate a detection sigial by comparing a reference voltage with the voltage of the first node after a required, desired or preset time period elapses, if the mode signal corresponds to the second logic state. For example, the voltage of the first node after the required, desired or preset time period elapses may be a data signal that changes according to an external stimulus.

If the mode signal corresponds to the first logic state, the data signal may be generated according to the detection signal, or if the mode signal corresponds to the second logic state, the data signal may be deactivated after reaching a desired, required or preset value during an initialization period.

The mode signal may be a clock signal having a required, desired or preset period.

BRIEF DESCRIPTION OF THE DRAWINGS

These and/or other aspects will become apparent and more readily appreciated from the following description of the example embodiments, taken in conjunction with the accompanying drawings of which.

DETAILED DESCRIPTION

The example embodiments will now be described more fully with reference to the accompanying drawings, in which exemplary embodiments are shown. The example embodiments may, however, be embodied in many different forms, and should not be construed as being limited to the embodiments set forth herein. Thus, the example embodiments may include all revisions, equivalents, or substitutions that are included in the concepts and the technical scope related to example embodiments.

While terms "first" and "second" are used to describe various components, it is obvious that the components are not limited to the terms "first" and "second". The terms "first" and "second" are used only to distinguish the components. For example, a first component may indicate a second component or a second component may indicate a first component without conflicting with the inventive concept.

Throughout the specification, it will also be understood that when an element is referred to as being "connected to" another element, it can be directly connected to the other element, or intervening elements may also be present. On the other hand, when an element is referred to as being "directly connected to" another element, it can be directly connected to the other element, and intervening elements may not be present. In addition, relative terms to describe relationship between elements such as "between" and "directly between", or "neighboring" and "directly neighboring" should be understood in the same manner.

Furthermore, all examples and conditional language recited herein are to be construed as being without limitation to such specifically recited examples and conditions. Throughout the specification, a singular form may include plural forms, unless there is a particular description contrary thereto. Also, terms such as "comprise" or "comprising" are used to specify existence of a recited form, a number, a process, an operations, a component, and/or groups thereof, not excluding the existence of one or more other recited forms, one or more other numbers, one or more other processes, one or more other operations, one or more other components and/or groups thereof.

Unless expressly described otherwise, all terms including descriptive or technical terms which are used herein should be construed as having meanings that are obvious to one of ordinary skill in the art. Also, terms that are defined in a general dictionary and that are used in the following description should be construed as having meanings that are equivalent to meanings used in the related description, and unless expressly described otherwise herein, the terms should not be construed as being ideal or excessively formal.

Reference will now be made in detail to embodiments, examples of which are illustrated in the accompanying drawings, wherein like reference numerals refer to the like elements throughout. In this regard, the example embodiments may have different forms and should not be construed as being limited to the descriptions set forth herein.

Figure 1:
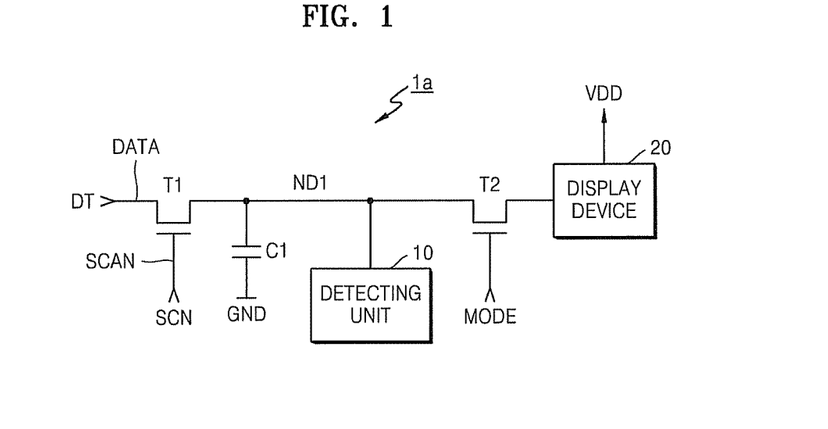
FIGS. 1 and 2 are circuit diagrams of a pixel circuit according to an example embodiment.

FIG. 1 is a circuit diagram of a pixel circuit 1a according to an example embodiment.

Referring to FIG. 1, the pixel circuit 1a may include first and second transistors T1 and T2, a capacitor C1, a display device 20, and a detecting unit 10.

The first transistor T1 provides a data signal DT to a first node ND1 in response to a scan signal SCN. The first transistor T1 may include a first terminal that is connected to a data line DATA and receives the data signal DT, a gate that is connected to a scan line SCAN and receives the scan signal SCN, and a second terminal that is connected to the first node ND1. The first transistor T1 may be a thin film transistor (TFT).

The pixel circuit 1a may perform different operations according to a mode signal MODE. For example, when the mode signal MODE is activated to correspond to a logic high state, the pixel circuit 1a may perform a displaying operation. When the mode signal MODE is deactivated to correspond to a logic low state, the pixel circuit 1a may perform a detecting operation.

In the displaying operation and the detecting operation, the data signal DT and the scan signal SCN may have different values. The pixel circuit 1a operates according to an operation period including a display period and a detection period. In this regard, a time interval in which the displaying operation is performed is referred to as the display period, and a time interval in which the detecting operation is performed is referred to as the detection period.

The capacitor C1 may be connected between the first node ND1 and a ground voltage GND. When the pixel circuit 1a performs the displaying operation, the capacitor C1 may store charges corresponding to the data signal DT. Also during the displaying operation, the capacitor C1 may provide a voltage of the first node ND1 to the display device 20 where the voltage of the first node ND1 is determined according to the stored charges.

For example, during the display period, the data signal DT may be an image signal corresponding to an image to be displayed by the pixel circuit 1a. Thus, the image may be displayed since the data signal DT corresponding to the image signal is provided to the display device 20. The image signal corresponds to the image to be displayed on the display device 20, and may be provided from an external source. In the pixel circuit 1a, the image to be displayed may be determined according to a detected external stimulus. When the pixel circuit 1a performs the detecting operation, the capacitor C1 stores the charges corresponding to the data signal DT, and the capacitor C1 changes the voltage of the first node ND1 by discharging the stored charges via the detecting unit 10.

Thus, the pixel circuit 1a may include the capacitor C1 that stores different charges according to an image to be displayed and the capacitor C1 changes a voltage of the first node ND1 by discharging the stored charges according to a detected external stimulus. Accordingly, the pixel circuit 1a may use the capacitor C1 in both of the displaying operation and the detecting operation. Because the capacitor C1 has a relatively larger size among passive devices and can be used in both the displaying operation and the detecting operation, the pixel circuit 1a may be smaller-sized.

Also, the pixel circuit 1a may perform the detecting operation on one pixel, so that the detection accuracy of the pixel circuit 1a may increase exactness with respect to the detection. Further, the pixel circuit 1a may display an image according to the detection result, so that the pixel circuit 1a may improve image definition. For example, if a capacitor that performs the detecting operation and a capacitor that performs the displaying operation are separate, a configuration of a pixel circuit becomes complicated and a size of the pixel circuit increases. In addition, in order to reduce or limit a size of a pixel circuit, a plurality of pixel circuits may include one capacitor that performs the detecting operation, but in this case, accuracy of the detecting operation may deteriorate.

The detecting unit 10 changes the voltage of the first node ND1 in response to the mode signal MODE. The detecting unit 10 may be connected between the first node ND1 and the ground voltage GND. Also, the detecting unit may be connected to the capacitor C1 in parallel, and may have different resistors according to an external stimulus.

The detecting unit 10 may include a photo TFT having a resistance varying according to an amount of light included in the external stimulus, or the detecting unit 10 may include a piezo resistor with a piezo effect having a resistance varying according to a pressure of the external stimulus.

The detecting unit 10 is activated by the mode signal MODE, and the detecting unit 10 discharges the charges stored in the capacitor C1 according to the external stimulus. The detecting unit 10 may be complementarily activated with respect to the second transistor T2. For example, when the mode signal MODE is deactivated and corresponds to a logic low state, the detecting unit 10 may be activated, and when the mode signal MODE is activated and corresponds to a logic high state, the detecting unit 10 may be deactivated.

That is, the detecting unit 10 is only activated during the detection period when the capacitor C1 is not electrically connected to the display device 20, and discharges the charges stored in the capacitor C1 according to the external stimulus.

The second transistor T2 may electrically connect the first node ND1 to the display device 20 in response to the mode signal MODE. When the mode signal MODE is deactivated and corresponds to a logic high state, the second transistor T2 may be turned on and provide the voltage of the first node ND1, and when the mode signal MODE is deactivated and corresponds to a logic low state, the second transistor T2 is turned off and electrically separates the first node ND1 from the display device 20.

The second transistor T2 may include a first terminal connected to the first node ND1, a gate receiving the mode signal MODE, and a second terminal connected to a first terminal of the display device 20. Also, the second transistor T2 may be a TFT.

The display device 20 may include the first terminal connected to the second transistor T2, and a second terminal receiving an external voltage VDD. The display device 20 may include a liquid crystal dielectric layer and a capsule between the first terminal and the second terminal, the capsule moving along an electric field. The display device 20 may display different images according to a voltage applied to the first terminal, that is, the voltage of the first node ND1. The external voltage VDD may be applied from an external apparatus.

The display device 20 may be a liquid crystal display (LCD) device, a plasma display device, an organic electroluminescent device, or an electrophoretic device that displays images based on the voltage applied between first and second terminals. A pixel circuit according to one or more example embodiments may be used in a reflection-type display system, and may not desire or demand a separate light source for a display. The display device 20 may maintain its previous state even when a voltage is not applied to the first and second terminals of the display device 20, so that power consumption may be limited or reduced.

As will be described later with reference to FIG. 7, in some example embodiments, the pixel circuit 1a may be connected to a determination unit 30 that is activated in the detection period. When the pixel circuit 1a performs the detecting operation, the determination unit 30 may detect the voltage of the first node ND1 in response to the scan signal SCN and then the determination unit 30 may generate a detection signal SNS. The detection signal SNS may have a value according to the external stimulus detected by the detecting unit 10, and when the detection signal SNS has an analogue value, the detection signal SNS may be digitized by a separate digitizer (not shown). When the pixel circuit 1a performs the displaying operation, the data signal DT may be provided according to the detection signal SNS generated during the detection period.

Figure 2:
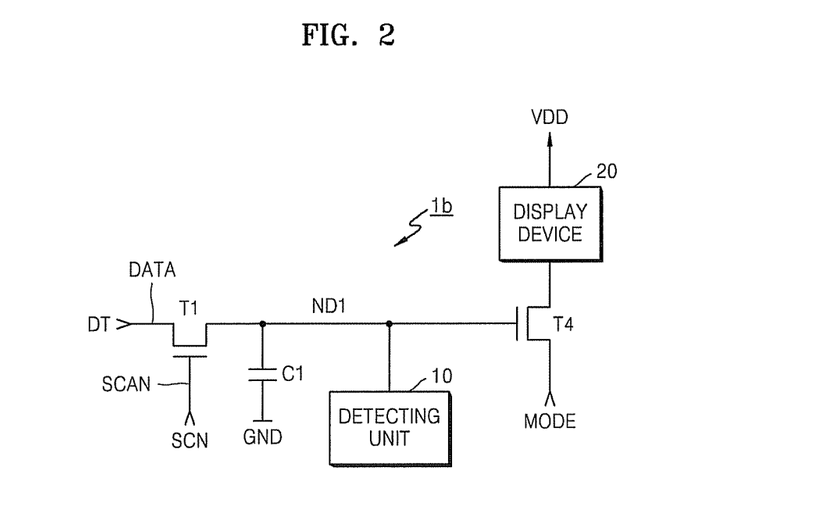

FIG. 2 is a circuit diagram of a pixel circuit 1b according to another example embodiment.

Referring to FIG. 2, the pixel circuit 1b may include a first transistor T1, a fourth transistor T4, a capacitor C1, a detecting unit 10, and a display device 20.

Compared to example embodiments of pixel circuit 1a of FIG. 1, the pixel circuit 1b may further include the fourth transistor T4 that provides a voltage of a first node ND1 in response to a mode signal MODE.

The fourth transistor T4 may include a first terminal receiving the mode signal MODE, a gate connected to the first node ND1, and a second terminal connected to the display device 20.

When a plurality of pixel circuits 1b is used in a display apparatus, the pixel circuits 10b may be sequentially driven in response to a scan signal. In this case, a data signal DT that is provided to the fourth transistor 14 via the first node ND1 may be provided to the display device 20 in response to the mode signal MODE. The pixel circuit 1b may display an image on the display device 20 in response to an external voltage VDD provided to the display device 20, instead of in response to the mode signal MODE. Therefore, the pixel circuit 1a of FIG. 1 may sequentially display an image in response to a scan signal SCN, while the display apparatus including the pixel circuit 1b of FIG. 2 may simultaneously display an image in response to the external voltage VDD.

Operations of the pixel circuit 1b of FIG. 2 are somewhat similar as the operations of the pixel circuit 1a of FIG. 1, and thus the detailed description thereof is omitted here.

Figure 3A:
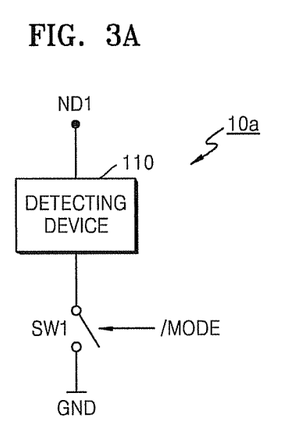
FIGS. 3A and 3B are diagrams of a detecting unit according to another example embodiment.

FIG. 3A is a diagram of a detecting unit 10a according to another example embodiment Referring to FIG. 3A, the detecting unit 10a may include a detecting device 110 and a switch SW1. The detecting device 110 is connected between a first node ND1 and the switch SW1, and may include a photo diode and a piezo resistor that have resistances varying according to an external stimulus. The switch SW1 may be connected between the detecting device 110 and a ground voltage GND and then may be activated in response to a mode signal MODE. As described above, when the mode signal MODE corresponds to a logic low state, the switch SW1 may be turned on to activate the detecting unit 10a.

Thus, the detecting unit 10a according to the present example embodiment may be activated in response to the mode signal MODE when pixel circuits 1a and 1b_perform a detecting operation, and may discharge charges stored in the capacitor C1. When the pixel circuit 1a or 1b performs a displaying operation, the detecting unit 10a is deactivated and does not affect a voltage of the first node ND1.

Figure 3B:
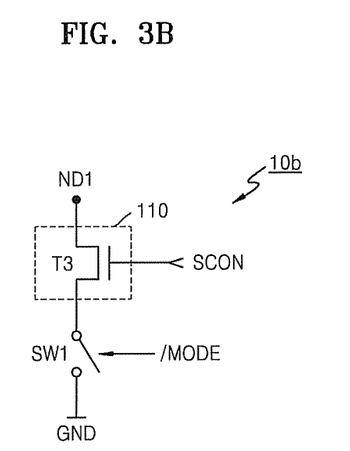

FIG. 3B is a diagram of a detecting unit 10b according to another example embodiment.

Referring to FIG. 3B, the detecting unit 10b may include a third transistor T3 and a switch SW1. The third transistor T3 may correspond to the detecting device 110 of FIG. 3A, and may include a first terminal connected to the first node ND1, a gate for receiving a detection control signal SCON, and a second terminal connected to the switch SW1. The detection control signal SCON may be provided from an external source such as a control unit. When the pixel circuit 1a or 1b performs a detecting operation, the third transistor T3 may be turned off when the detection control signal SCON has a value smaller than a threshold voltage value of the third transistor T3.

The third transistor T3 may be a photo TFT having a resistance varying according to an amount of light included in an external stimulus.

Figure 4:
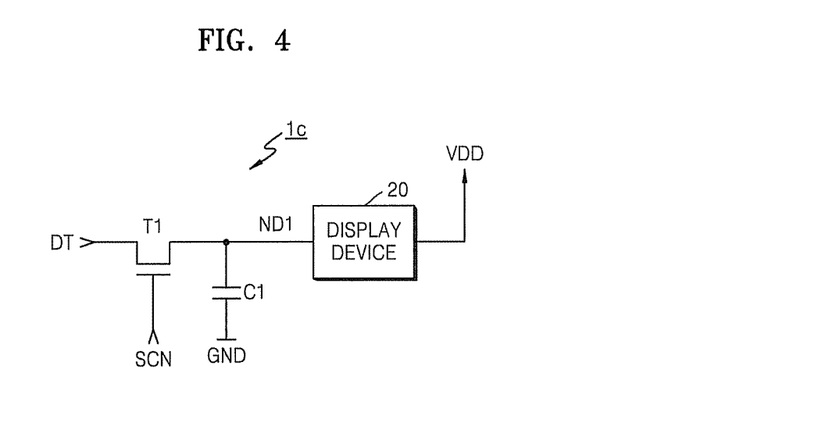
FIGS. 4 and 5 are circuit diagrams of the pixel circuit that performs different operations in response to a mode signal according to an example embodiment.
Figure 5:
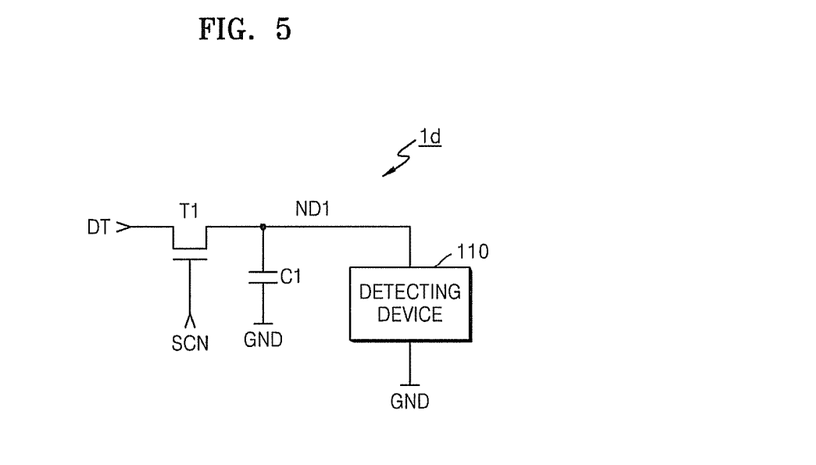

FIGS. 4 and 5 are circuit diagrams of the pixel circuits 1c and 1d that perform different operations in response to a mode signal according to the example embodiments. FIGS. 4 and 5 illustrate a circuit configuration that differs according to operation statuses of the pixel circuits 1a and 1b of FIGS. 1 and 2.

FIG. 4 is a circuit diagram for illustrating a case in which the pixel circuit 1c performs a displaying operation.

When the pixel circuit 1c performs the displaying operation, a mode signal MODE may be activated and thus corresponds to a logic high state. Thus, the switch SW1 is open as shown in FIGS. 3a and 3b, and the detecting device 110 does not operate. A scan signal SCN may be sequentially activated according to a method of driving a display apparatus including the pixel circuit 1c, and a data signal DT is applied to the first node ND1 in response to the scan signal SCN. Charges may be charged in the capacitor C1 according to the data signal DT that is applied to the first node ND1, and an image may be displayed on the display device 20 according to an amount of the charged charges, that is, a voltage of the first node ND1. When the switch SW1 is open, the detecting unit 10 is open so that, in the case of FIG. 4, the pixel circuit 1c does not operationally include the detecting unit 10.

FIG. 5 is a circuit diagram illustrating a case in which the pixel circuit 1d performs a detecting operation.

When the pixel circuit 1d performs the detecting operation, a mode signal MODE may be deactivated and thus correspond to a logic low state. Thus, the detecting unit 10 is activated, and the second transistor T2 is turned off. When the second transistor T2 is turned off, the display device 20 is electrically separated from the first node ND1. In a case where the display device 20 maintains its previous state without receiving a voltage, the display device 20 displays substantially the same image irrespective of the electrical separation from the first node ND1.

However, when the display device 20 is electrically separated from the first node ND1, the charges charged in the display device 20 may be discharged, so that reliability of an operation of the display device 20 may be maintained when a period of the mode signal MODE becomes as short as possible.

The first transistor T1 provides a data signal DT to the first node ND1 in response to a scan signal SCN. During the detecting operation, the data signal DT may initialize the capacitor C1. Thus, in a plurality of pixel circuits, the data signal DT may have a required or preset value, and when the capacitor C1 has a particular value after receiving the data signal DT that has the required or preset value, the first transistor T1 may be turned off in response to the scan signal SCN. An amount of charges that are discharged from the capacitor C1 may vary during the same time period according to a resistance of the detecting device 110 included in the detecting unit 10.

An external stimulus may be characterized by an amount of light and external pressure. In an example embodiment where the detecting device 110 is a photo TFT having a resistance varying according to an amount of light, the detecting device 110 may have a resistance varying according to the amount of light. In another example embodiment, the detecting device 110 may be a piezo resistor having a resistance varying according to the pressure. For example, the piezo resistor may be a semiconductor pressure sensor chip operating according to a piezo effect.

When the detecting device 110 is formed as a photo TFT, resistances may differ in a light receiving region and a light not-receiving region of the pixel circuit 1d during the detecting operation, so that the voltage of the first node ND1 may vary after the same time period elapses. Thus, after a certain time period elapses during the detecting operation, the scan signal SCN may be activated so that the voltage of the first node ND1 may be applied to the detecting unit 10 via the first transistor T1. The detecting unit 10 may measure an external stimulus by measuring the amount of discharged charges according to the voltage of the first node ND1.

Figure 6:
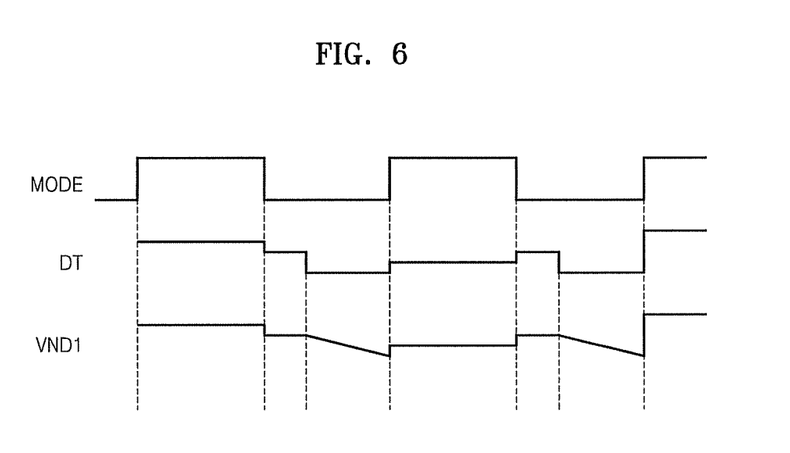
FIG. 6 is a waveform diagram for describing operations of the pixel circuit according to an example embodiment.

In the description with reference according to the below example embodiments, the pixel circuit 1 includes the pixel circuits 1a and 1b of FIGS. 1 and 2. FIG. 6 is a waveform diagram for describing operations of the pixel circuit 1 according to example embodiments.

Referring to FIG. 6, a mode signal MODE has a logic high state and a logic low state at regular intervals. The mode signal MODE may correspond to a clock signal, but is not limited thereto. FIG. 6 corresponds to an example embodiment in which the pixel circuit 1 is in a display period for performing a displaying operation when the mode signal MODE has the logic high state, and the pixel circuit 1 is in a detection period for performing a detecting operation when the mode signal MODE has the logic low state. For example, when the mode signal MODE corresponds to the logic low state, the pixel circuit 1 may be substantially the same as the pixel circuit 1d of FIG. 5, and when the mode signal MODE corresponds to the logic high state, the pixel circuit 1 may be substantially the same as the pixel circuit 1c of FIG. 4.

While the pixel circuit 1 performs the displaying operation, a data signal DT may have a value that varies according to an image to be displayed by the pixel circuit 1. As described above, when the displaying operation is performed, the data signal DT may be generated according to a detection signal SNS, or may be generated according to an externally received control signal. For example, when the pixel circuit 1 performs the displaying operation, the data signal DT may correspond to an image signal.

When the pixel circuit 1 performs the displaying operation, the detecting unit 10 is deactivated and thus is not electrically connected to the first node ND1. Since the first transistor T1 is turned on in response to the mode signal MODE, a voltage VND1 of the first node ND1 may be substantially the same as the data signal DT. Also, since the second transistor T2 is turned on in response to the mode signal MODE, a voltage that is applied to the first terminal of the display device 20 may be substantially the same as the voltage VND1 of the first node ND1. However, a size of an electric field applied to the display device 20 may vary by an external voltage VD applied to the second terminal of the display device 20, so that visual information displayed on the display device 20, e.g., an alignment state of the liquid crystal dielectric layer in the display device 20, may not be proportional to the voltage VND1 of the first node ND1.

Figure 7:
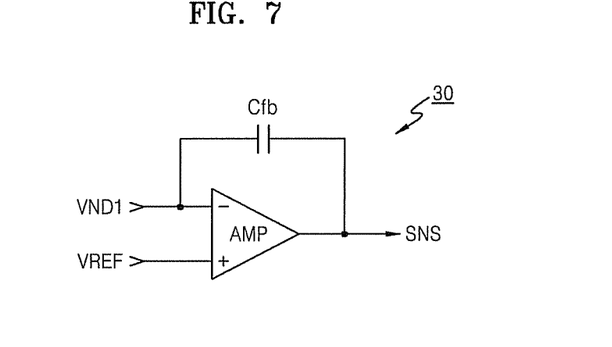
FIG. 7 is a circuit diagram of a determining unit according to another example embodiment.

FIG. 7 is a circuit diagram of a determining unit 30 according to another example embodiment.

Referring to FIG. 7, the determining unit 30 may include an amplifier AMP and a feedback capacitor Cfb, wherein the amplifier AMP includes a non-inverting terminal that receives a reference voltage VREF, and an inverting terminal that is connected to the second terminal of the first transistor T1 included in the pixel circuit 1, i.e., a terminal for receiving a data signal DT, and receives a voltage VND1 of the first node ND1. The feedback capacitor Cfb is connected between the inverting terminal and an output terminal of the amplifier AMP. For example, the determining unit 30 may be connected to a data line and thus may be included in a data driver circuit.

The amplifier AMP may generate a detection signal SNS by amplifying a difference between the voltage VND1 of the first node ND1 and the reference voltage VREF. The voltage VND1 of the first node ND1 may be provided so that the scan signal SCN is activated to turn on the first transistor T1, so as to measure the charges that are discharged from the capacitor C1 after a time during the detecting operation elapses. The feedback capacitor Cfb is connected between the inverting terminal and the output terminal of the amplifier AMP, so as to reduce, limit or prevent a large current from being instantaneously generated in the determining unit 30. A constant current flows the detecting device 110, which has a resistance varying according to an external stimulus, according to an external stimulus so that charges stored in the capacitor C1 are uniformly discharged during a unit of time. However, in a case where the external stimulus sharply changes, a large current may suddenly or instantaneously flow through the detecting device 110. In this regard, since the determining unit 30 includes the feedback capacitor Cfb, the determining unit 30 may reduce, limit or prevent the charges stored in the capacitor C1 from being suddenly or instantaneously discharged.

Thus, according to the scan signal SCN, the determining unit 30 may generate the detection signal SNS by receiving the data signal DT that is changed according to the external stimulus, that is, by receiving the voltage VND1 of the first node ND1 after a required, desired or preset time period elapses.

Figure 8:
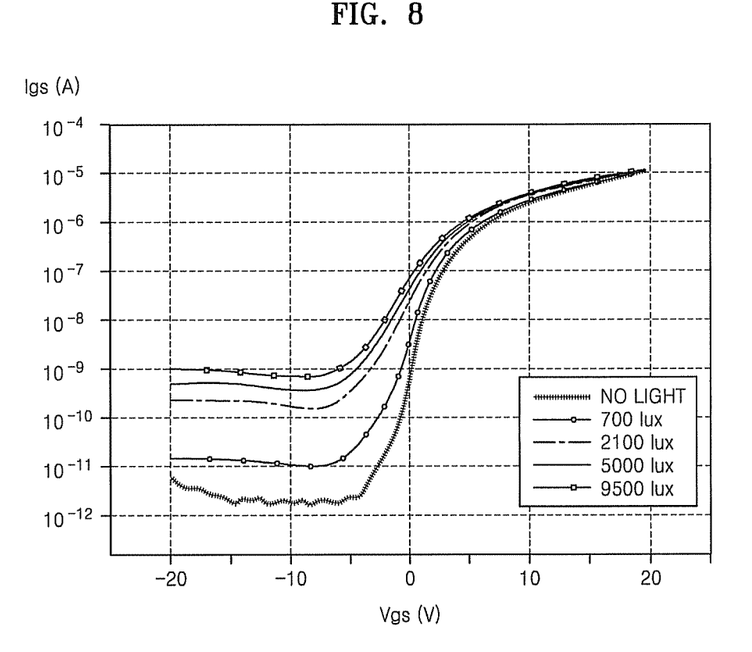
FIG. 8 is a graph for describing a characteristic of a detecting device included in a detecting unit, and shows a variation of a resistance of a photo thin film transistor (TFT) corresponding to the detecting device.

FIG. 8 is a graph for describing a characteristic of the detecting device 110 included in the detecting unit 10. The graph of FIG. 8 shows a resistance variation of a photo TFT corresponding to the detecting device 110.

In FIG. 8, an X-axis represents a gate-source voltage Vgs of the photo TFT, and a Y-axis represents a drain-source current Ids of the photo TFT. In FIG. 8, a drain-source voltage Vds of the photo TFT is constantly maintained at 10.1V.

Referring to FIG. 8, when an amount of light is constant, the drain-source current Ids sharply changes according to the gate-source voltage Vgs at about 0V. This indicates that the drain-source current Ids does not flow (turn-off state) and then flows (turn-on state) according to a threshold voltage of the photo TFT.

A leakage current that is measured by the drain-source current Ids in the turn-off state when the gate-source voltage Vgs is smaller than the threshold voltage may vary according to an amount of light included in an external stimulus.

As the amount of light increases, a resistance value of the photo TFT decreases so that the drain-source current Ids of the photo TFT increases. Thus, after the same amount of charges are charged in each of the capacitors C1 included in the plurality of pixel circuits and then initialized, if different currents flow through the capacitors C1 during a required, desired or preset time period, levels of voltages VND1 of first nodes ND1 in the plurality of pixel circuits at the same time point may be different from each other. Thus, the determining unit 30 detects the voltage VND1 of the first node ND1 after a time elapses, and then calculates the external stimulus applied to the pixel circuit 1.

In FIG. 8, regarding a case in which the photo TFT is not exposed to light and cases in which the photo TFT is exposed to light having an intensity of 9500 lux, with respect to the gate-source voltage Vgs at about 0V that is around a threshold voltage, when the gate-source voltage Vgs is greater than the threshold voltage, the photo TFTs in the aforementioned cases may have substantially the same drain-source current Ids in spite of different amounts of light. However, in a case where the gate-source voltage Vgs is smaller than the threshold voltage so that the photo TFT that is the detecting device 110 is turned off, a difference in the drain-source current Ids between the aforementioned cases increases up to 1 nA. Thus, in a case where the detecting device 110 is formed as the photo TFT, if a voltage less than the threshold voltage is applied to a gate of the photo TFT while a detecting operation is performed, an external stimulus may be detected. For example, during a detection period, the detection control signal SCON of FIG. 3B may have a value smaller than a threshold voltage of the third transistor T3.

Figure 9:
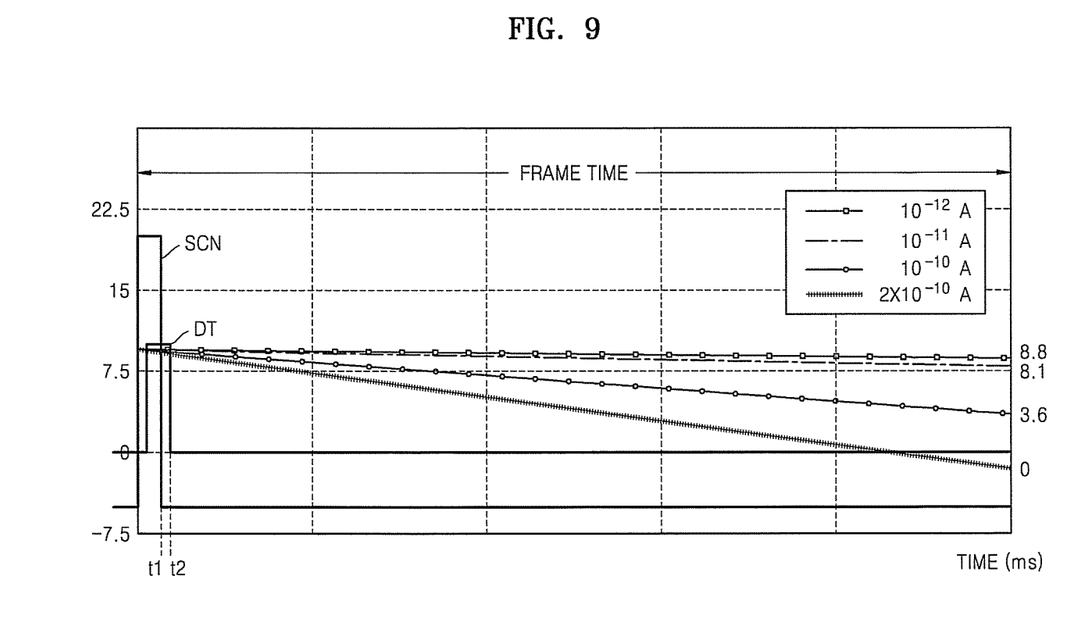
FIG. 9 is a graph for describing a voltage variation in a first node of the pixel circuit during a detection period.

FIG. 9 is a graph for describing a voltage variation in the first node ND1 of the pixel circuit 1 during a detection period.

Referring to FIG. 9, up to a time point t1, a scan signal SCN that is applied to the gate of the first transistor T1 is activated so that a data signal DT is provided to the first node ND1. The data signal DT may have a required, desired or preset value. For example, by is applied, and charges are charged in the capacitor C1 in response to the data signal DT, so that a voltage VND1 of the first node ND1 is substantially the same as the data signal DT.

The scan signal SCN is deactivated, so that the first transistor T1 is turned off, and the data signal DT is deactivated. The data signal DT may have the preset value of 10V up to a time point t2 after a required, desired or preset time period elapses after the scan signal SCN is deactivated. Hereinafter, with respect to the detection period, a time period in which the data signal DT maintains its required, desired or preset voltage so as to initialize the amount of charges stored in the capacitor C1 is referred to as an initialization period.

The charges stored in the capacitor C1 are discharged via the detecting unit 10, so that the voltage VND1 of the first node ND1 linearly decreases. As described above with reference to FIG. 8, a value of the drain-source current Ids of the photo TFT corresponding to the detecting device 110 varies according to the amount of light, so that the voltage VND1 of the first node ND1 at the time point t2 may vary according to the amount of light. Also, in another embodiment, in a case where the detecting device 110 has a resistance that varies according to a pressure, a current that flows through the detecting device 110 during a unit of time may vary according to the pressure, so that the voltage VND1 of the first node ND1 may also vary.

For example, when an external stimulus such as light having an intensity of 5000 lux is applied to the detecting device 110, a leakage current from about 10 to about 11 A flows via the detecting device 110, so that the voltage VND1 of the first node ND1 at a time point after 16 s may be about 8.1V. A time point used to detect the voltage VND1 of the first node ND1 may vary in the detection period, and in this regard, the voltage VND1 of the first node ND1 may have the preset value, or the voltage VND1 of the first node ND1 may be controlled to be detected by an external control signal at different time points. For example, the scan signal SCN may be activated so that the voltage VND1 of the first node ND1 may be detected. The determining unit 30 of FIG. 7 may be controlled to be activated at the time of detecting the voltage VND1 of the first node ND1.

Figure 10:
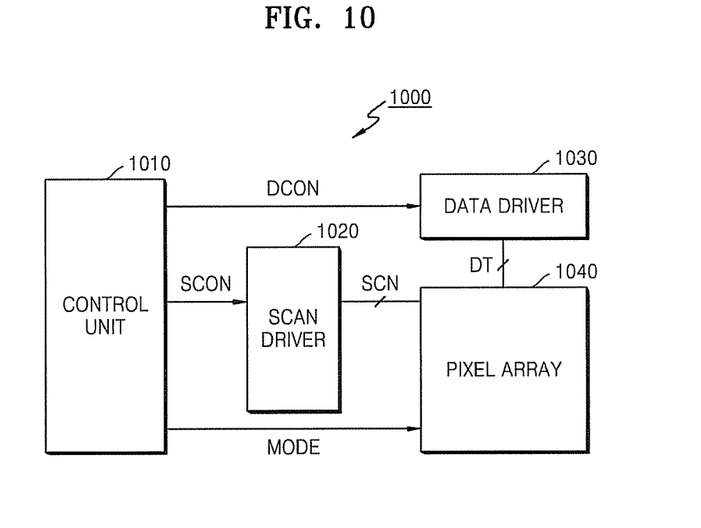
FIG. 10 is a block diagram of a display apparatus including the pixel circuit according to another example embodiment.

FIG. 10 is a block diagram of a display apparatus 1000 including the pixel circuit 1 according to another embodiment of the present invention.

Referring to FIG. 10, the display apparatus 1000 may include a control unit 1010, a scan driver 1020, a data driver 1030, and a pixel array 1040.

The control unit 1010 may generate a data control signal DCON, a scan control signal SOON, and a mode signal MODE. The data control signal DCON provides a different data signal DT according to the mode signal MODE. As described above, the data signal DT may be provided in different manners with respect to a display period and a detection period. During the display period, a data signal DT allows different images to be displayed according to a detection signal SNS that is generated by the determining unit 30 included in the data driver 1030. During the detection period, as described above with reference to FIG. 9, a data signal DT may be generated to provide a required desired or preset value and then to be deactivated.

The mode signal MODE may correspond to a clock signal based on a frame period of the display apparatus 1000, but is not limited thereto, and thus may be generated based on a signal received from an external source such as a host. The scan control signal SOON is provided to the scan driver 1020 so that a scan signal SCN is provided to the pixel array 1040. A function of the scan signal SCN may vary according to a scanning method of the display apparatus 1000. For example, the scan signal SCN may sequentially activate a plurality of scan lines included in the pixel array 1040, or may sequentially activate odd and even scan lines in an alternate manner. Also, the scan signal SCN may be generated to simultaneously activate all scan lines. In addition, the scan control signal SOON may be provided to each pixel circuits included in the pixel array 1040.

The scan driver 1020 is connected to each of the plurality of scan lines included in the pixel array 1040, and provides a corresponding scan signal SCN to each of the plurality of scan lines according to a scan control signal SCON received from the control unit 1010.

The data driver 1030 receives the data control signal DCON and then provides a plurality of data signals DT to the pixel array 1040. The data driver 1030 may operate by receiving a separate driving voltage, and the plurality of data signals DT may be provided to a plurality of data lines, respectively. Since different data signals DT are provided according to operation periods of the display apparatus 1000, the data driver 1030 may include a separate storage circuit such as a latch circuit so as to store a data signal DT provided in a display period. Also, the data driver 1030 may include the determining unit 30. The determining unit 30 may detect an external stimulus by receiving a first node voltage VND1 in response to the scan signal SCN during a detection period, and may provide the detection signal SNS as the data signal DT.

When a mode signal MODE is activated and thus corresponds to a logic high state by receiving the data signal DT and the scan signal SCN, that is, during the display period in which a displaying operation is performed, the pixel array 1040 transfers the data signal DT in response to the scan signal SCN. When the mode signal MODE is deactivated and thus corresponds to a logic low state, that is, during the detection period in which a detecting operation is performed, the pixel array 1040 may generate and provide the detection signal SNS to the control unit 1010, wherein the detection signal SNS is generated based on a voltage VND1 of the first node ND1 which is initialized and then discharged after an a time elapses according to the data signal DT. Charges stored in a capacitor C1 of each pixel circuit included in the pixel array 1040 are discharged during a required desired or preset time period according to the data signal DT so that the detection signal SNS may be generated, and the control unit 1010 may generate a data signal DT based on the detection signal SNS. That is, the display apparatus 1000 may display different images according to an external stimulus that is detected during the detection period.

Figure 11:
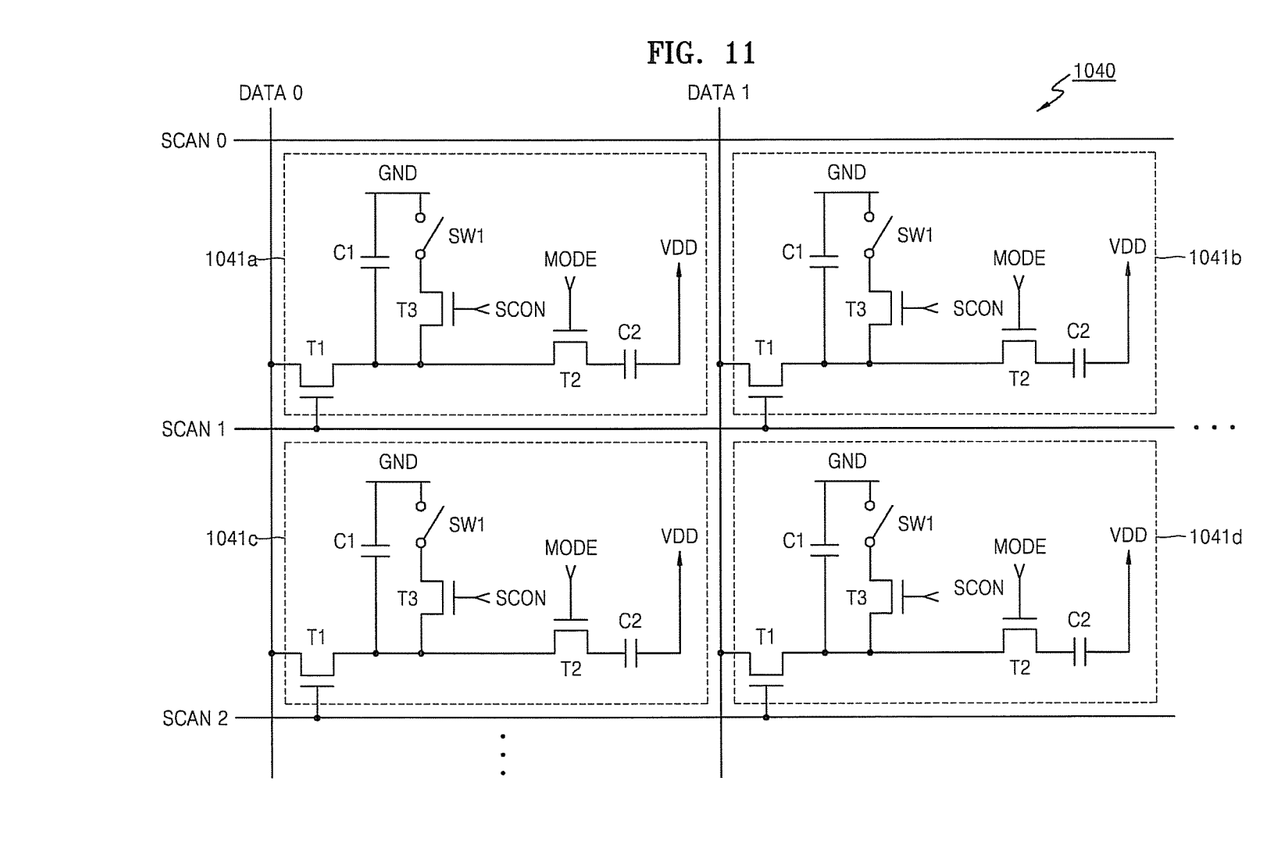
FIG. 11 is a circuit diagram of a pixel array according to an example embodiment.

FIG. 11 is a circuit diagram of the pixel array 1040 according to an example embodiment.

Referring to FIG. 11, the pixel array 1040 may include a plurality of data lines DATA0, DATA1, and DATA2, a plurality of scan lines SCAN0, SCAN1, and SCAN2, and a plurality of pixel circuits 1041a, 1041b, 1041c, and 1041d.

The plurality of data lines DATA0, DATA1, and DATA2 receive a data signal DT from the data driver 1030, and provide the data signal DT to the plurality of pixel circuits 1041a, 1041b, 1041c, and 1041d. A plurality of data lines may function to provide a data signal corresponding to an image to be displayed. However, the plurality of data lines DATA0, DATA1, and DATA2 included in the pixel array 1040 may display an image by receiving the data signal DT during a display period, and may detect an external stimulus by discharging stored charges based on the data signal DT during a detection period.

The plurality of scan lines SCAN0, SCAN1, and SCAN2 receive a scan signal SCN from the scan drive 1020. The plurality of pixel circuits 1041*a*, 1041*b*, 1041*c*, and 1041*d* are connected to the plurality of scan lines SCAN0, SCAN1, and SCAN2, respectively, and are activated in response to the scan signal SCN.

The plurality of pixel circuits 1041*a*, 1041*b*, 1041*c*, and 1041*d* are respectively connected to data lines and scan lines crossing each other, and receive the data signal DT and the scan signal SCN. Each of the plurality of pixel circuits 1041*a*, 1041*b*, 1041*c*, and 1041*d* may have the same configuration as in FIGS. 1 and 2.

In the display apparatus according to the one or more embodiments, each of the plurality of pixel circuits may simultaneously perform the displaying and detecting operations, so that detection accuracy can be improved. Also, since each pixel circuit uses one capacitor for both the displaying and detecting operations, the whole pixel circuit can be simplified.

The display apparatus including the pixel circuit according to the one or more embodiments may be applied to a reflection-type display apparatus. The reflection-type display apparatus does not require or demand a separate backlighting device, and may accurately display an image even in a dim place. Also, the reflection-type display apparatus may be an electrophoretic type display apparatus, an electrochromic type display apparatus, a thermal display apparatus, and a display apparatus of a black and white rotation motion type. The reflection-type display apparatus according to the one or more embodiments may have a wide viewing angle similar to a printed product, may reduce power consumption, and may have a memory function. Thus, manufacturing costs may be reduced, and the reflection-type display apparatus may be used in an image display for portable terminals or may be used in an electronic paper.

In an example embodiment, an electronic paper display is characterized by smaller manufacturing costs and may not require a separate backlighting, so that the electronic paper display may operate by using a very small amount of energy. In the case of an electronic paper having an electronic ink, an electric power is necessary only when an ink array is aligned, so that the electronic paper may operate by using a very small amount of energy. Also, the electronic paper has a clear display and a wide viewing angle, and most of all, the electronic paper may be repeatedly bent like regular paper without a change in resolution and contrast, so that the electronic paper may be applied to many fields.

As described above, according to the one or more of the above embodiments , the pixel circuit for displaying an image by receiving an external stimulus includes the transistors and the detecting unit which are complementarily activated according to operation periods of the pixel circuit, and the capacitor performs different operations according to the operation periods, so that one pixel circuit may perform both a displaying operation and a detecting operation. Accordingly, the pixel circuit may display the detected image with high definition.

Also, in the display apparatus including the pixel circuit according to the one or more of the above embodiments, each pixel circuit may perform a detecting operation, may improve definition based on a detected signal, and may not require a separate backlight, so that power consumption may be reduced.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A pixel circuit comprising:
a first transistor configured to supply a first signal to a first node in response to a second signal;
a capacitive unit connected between the first node and a ground voltage;
a detecting unit configured to change a voltage of the first node by being activated in response to a third signal, and the detecting unit having a resistance varying according to an external stimulus; and
a second transistor configured to be complementarily activated with respect to the detecting unit in response to the third signal and provide a voltage of the first node to a display device in response to the third signal.

2. The pixel circuit of claim 1, wherein the detecting unit comprises:
a third transistor including a first terminal connected to the first node, and a gate configured to receive a detection control signal; and
a switch that electrically connects a second terminal of the third transistor and a ground voltage in response to the third signal.

3. The pixel circuit of claim 2, wherein the third transistor is a photo resistor with a resistance that varies according to an amount of light of the external stimulus.

4. The pixel circuit of claim 3, wherein the detection control signal has a voltage that is smaller than a threshold voltage value of the third transistor.

5. The pixel circuit of claim 1, wherein the detecting unit is a piezo resistor, and the resistance of the piezo resistor varies according to a pressure of the external stimulus.

6. The pixel circuit of claim 1, further comprising:
a determining unit configured to output a detection signal in response to the second signal, the detecting signal being based on the voltage of the first node.

7. The pixel circuit of claim 6, wherein the determining unit comprises:
an amplifier including,
a first terminal configured to receive the voltage of the first node, and
a second terminal configured to receive a reference voltage, amplify a voltage difference between the first terminal and the second terminal, and provide the detection signal to an output terminal, and
a feedback capacitor connected between the first terminal and the output terminal.

8. The pixel circuit of claim 1, wherein,
the display device is connected to the second transistor.

9. The pixel circuit of claim 8, wherein the display device is at least one of a liquid crystal display (LCD) device, a plasma display device, an organic electroluminescent device, and an electrophoretic device.

10. The pixel circuit of claim 8, wherein, when the third signal corresponds to a first logic state,
the second signal corresponds to an image signal, the second transistor is configured to provide the image signal to the display device in response to a selection signal, and the detecting unit is configured to deactivate.

11. The pixel circuit of claim 8, wherein, when the third signal corresponds to a second logic state,
the data signal has a first value, the detecting unit is configured to discharge charges stored in a capacitor, and the second transistor is deactivated, and wherein the capacitor is connected in parallel with the detecting unit.

12. The pixel circuit of claim 8, wherein the second transistor comprises:
a first terminal connected to the first node,
a gate receiving the third signal, and
a second node connected to the display device.

13. The pixel circuit of claim 8, wherein the second transistor comprises:
a second node connected to the display device,
a gate connected to the first node, and
a second terminal receiving the third signal.

14. A display apparatus comprising:
a control unit configured to generate a first control signal, a second control signal, and a mode signal;
a scan driver configured to generate a scan signal according to the second control signal;
a data driver configured to generate a first data signal according to the first control signal; and
a pixel array configured to transfer the first data signal when the mode signal corresponds to a first logic state, and to provide the data driver with a second data signal when the mode signal corresponds to a second logic state, the second data signal being different than the first data signal, and the second data signal being based on an external stimulus.

15. The display apparatus of claim 14, wherein the pixel array comprises:
a plurality of scan lines configured to receive the scan signal;
a plurality of data lines configured to receive the data signal; and
a plurality of pixel circuits that are connected to the plurality of scan lines and the plurality of data lines, and each of the plurality of pixel circuits including,
a first transistor configured to supply the data signal to a first node in response to the scan signal,
a capacitor that is connected between the first node and a ground voltage,
a detecting unit that is connected between the first node and the ground voltage, and configured to change the data signal by being activated in response to the mode signal, and the detecting unit having a resistance value that varies according to the external stimulus,
a second transistor that is configured to provide a voltage of the first node in response to the mode signal, and
a display device configured to receive the voltage of the first node from the second transistor.

16. The display apparatus of claim 15, wherein the detecting unit includes a photo thin film transistor (TFT) and a piezo resistor that have resistances varying according to the external stimulus.

17. The display apparatus of claim 15, wherein the display device includes,
a first terminal configured to receive the voltage of the first node, and
a second terminal configured to receive an external voltage, and the display device is a reflective display device configured to display different images according to an electric field.

18. The display apparatus of claim 15, wherein the data driver includes a determining unit configured to generate a detection signal when the mode signal corresponds to the second logic state by comparing a reference voltage with the voltage of the first node after a time period elapses.

19. The display apparatus of claim 14, wherein, when the mode signal corresponds to the first logic state, the data signal is generated according to the detection signal.

20. The display apparatus of claim 14, wherein, when the mode signal corresponds to the second logic state, the data signal is deactivated after reaching a first value during an initialization period.

\* \* \* \* \*